(12) United States Patent
Liverman et al.

(10) Patent No.: US 9,143,667 B1
(45) Date of Patent: Sep. 22, 2015

(54) HELMET MOUNTED IMAGING SYSTEMS

(71) Applicants: Ernest Liverman, Shreveport, LA (US); Jeremey Jeansonne, Shreveport, LA (US)

(72) Inventors: Ernest Liverman, Shreveport, LA (US); Jeremey Jeansonne, Shreveport, LA (US)

(73) Assignee: SPORTS VIDEO INNOVATIONS, Shreveport, LA (US)

( * ) Notice: Subject to any disclaimer, the term of this patent is extended or adjusted under 35 U.S.C. 154(b) by 155 days.

(21) Appl. No.: 13/874,857

(22) Filed: May 1, 2013

(51) Int. Cl.
*H04N 5/225* (2006.01)

(52) U.S. Cl.
CPC .................................. *H04N 5/2253* (2013.01)

(58) Field of Classification Search
CPC ........................ H04N 21/4126; H04N 21/4122
See application file for complete search history.

(56) References Cited

U.S. PATENT DOCUMENTS

| | | | |
|---|---|---|---|
| 6,819,354 B1* | 11/2004 | Foster et al. | 348/157 |
| 7,570,301 B2* | 8/2009 | Gilor | 348/373 |
| 8,477,046 B2* | 7/2013 | Alonso | 340/870.11 |
| 8,531,592 B2* | 9/2013 | Teetzel et al. | 348/373 |
| 2007/0163158 A1* | 7/2007 | Bentz | 40/329 |
| 2009/0109292 A1* | 4/2009 | Ennis | 348/158 |
| 2013/0033610 A1* | 2/2013 | Osborn | 348/207.1 |

* cited by examiner

*Primary Examiner* — Lin Ye
*Assistant Examiner* — John H Morehead, III
(74) *Attorney, Agent, or Firm* — R. Keith Harrison

(57) ABSTRACT

An illustrative embodiment of helmet mounted imaging systems for a helmet includes an impact-resistant system housing adapted for attachment to the helmet; an image capture and transmission system carried by the system housing, the image capture and transmission system including at least one image sensor; and an impact-resistant image sensor shield carried by the system housing, the image sensor shield substantially covering the image sensor. Alternative illustrative embodiments of the helmet mounted imaging systems are disclosed.

19 Claims, 5 Drawing Sheets

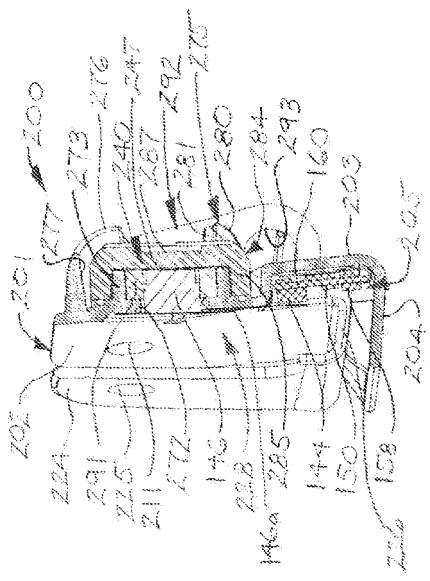
FIG. 9
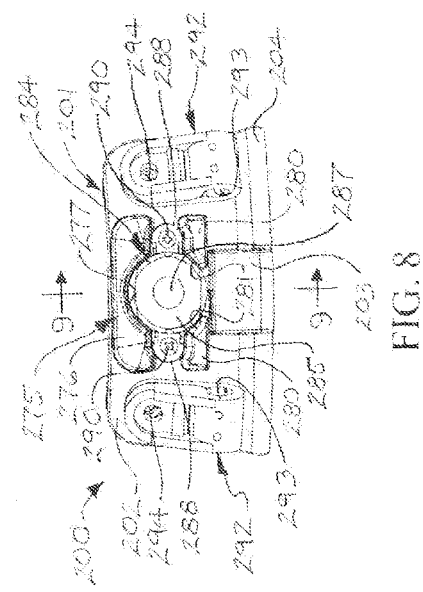
FIG. 8
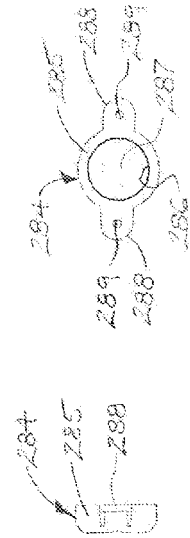
FIG. 10
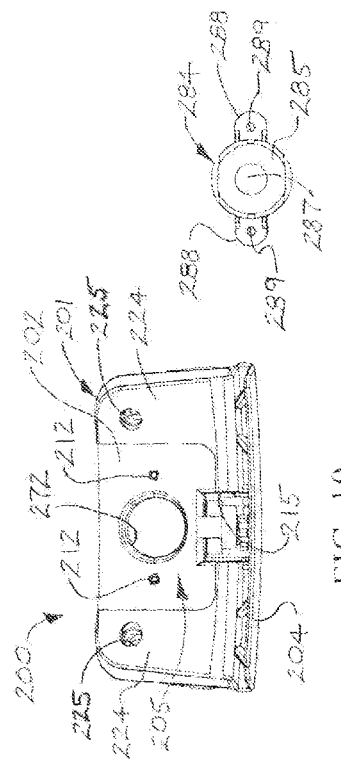
FIG. 11
FIG. 12
FIG. 13

HELMET MOUNTED IMAGING SYSTEMS

FIELD

Illustrative embodiments of the disclosure are generally directed to cameras and other image sensors. More particularly, illustrative embodiments of the disclosure are directed to helmet mounted imaging systems having at least one image sensor which is unobtrusively and protectively mounted on a helmet that may be worn by a sports participant during a sporting event for the capture and transmission of game images from the helmet.

BACKGROUND

Images of contemporary sporting events at all skill levels are frequently captured and transmitted for viewers typically for immediate display at the event or for viewing via television or the Internet. Over the years, efforts to capture images which are as close as possible to play have been devised for the excitement and entertainment of viewers as well as to review plays. Some of these efforts may include field-mounted or player-mounted cameras or image sensors which capture and transmit the images to a system which processes and displays the images. It may be desirable to mount such a camera or other image sensor in a location which both minimizes interference with game play and maximally protects the image sensor.

Accordingly, helmet mounted imaging systems having at least one image sensor which is unobtrusively and protectively mounted on a helmet that may be worn by a sports participant during a sporting event for the capture and transmission of game images from the helmet may be desirable for some applications.

SUMMARY

An illustrative embodiment of helmet mounted imaging systems for a helmet includes an impact-resistant system housing adapted for attachment to the helmet; an image capture and transmission system carried by the system housing, the image capture and transmission system including at least one image sensor; and an impact-resistant image sensor shield carried by the system housing, the image sensor shield substantially covering the image sensor.

An alternative illustrative embodiment of helmet mounted imaging systems for a helmet includes an impact-resistant system housing haying a housing base wall; a housing cover wall carried by the housing base wall, the housing cover wall having a first cover wall portion; a second cover wall portion; a center cover wall portion extending between the first cover wall portion and the second cover wall portion; and a lens cover carried by the center cover wall portion. An image capture and transmission system is disposed in the system housing, the image capture and transmission system including at least one image sensor adjacent to the lens cover.

BRIEF DESCRIPTION OF THE DRAWINGS

Illustrative embodiments of the disclosure will now be described, by way of example, with reference to the accompanying drawings, in which:

FIG. 8 is a front view of the alternative illustrative helmet mounted imaging system illustrated in FIG. 6;

FIG. 9 is a transverse sectional view, taken along section lines 9-9 in FIG. 8, of the alternative illustrative helmet mounted imaging system;

FIG. 10 is a rear view of the alternative illustrative helmet mounted imaging system;

FIG. 11 is a front view of an exemplary image sensor shield according to the alternative illustrative helmet mounted imaging system;

FIG. 12 is a side view of the exemplary image sensor shield illustrated in FIG. 11; and FIG. 13 is a rear view of the exemplary image sensor shield illustrated in FIG. 11.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiment or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper", "lower", "front" and "rear" are intended to be used in an illustrative and not a limiting sense. In some applications, for example, those elements which are identified as "upper" may be located in other spatial relationships relative to those elements which are identified as "lower" in the following detailed description.

Figure 2:
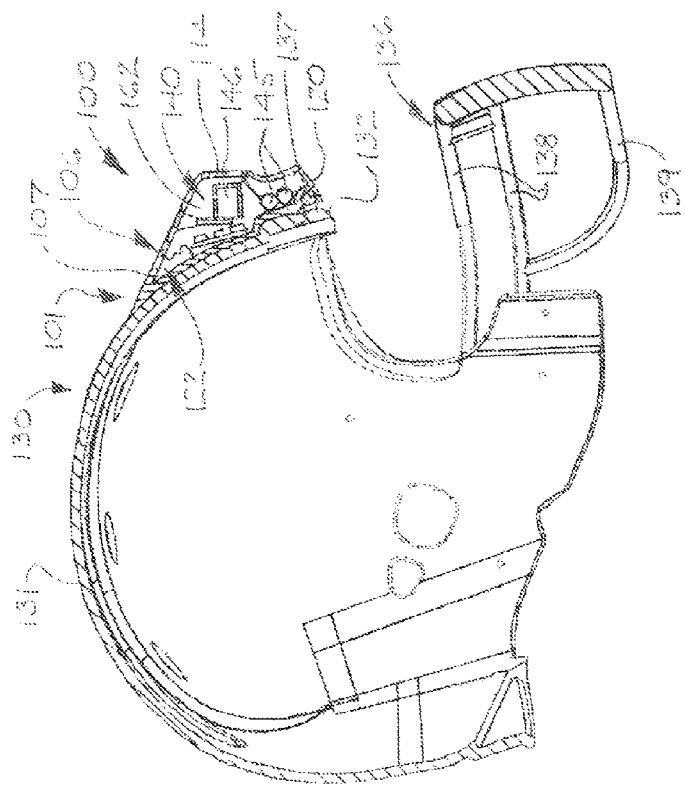
FIG. 2 is a transverse sectional view, taken along section lines 2-2 in FIG. 1, of the helmet and helmet mounted imaging system.
Figure 3:
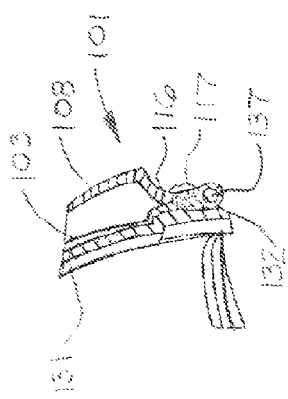
FIG. 3 is an enlarged transverse sectional view of the illustrative helmet mounted imaging system, taken along section lines 3-3 in FIG. 1, more particularly illustrating an exemplary fastener technique for attaching a system housing of the system to the helmet.
Figure 1:
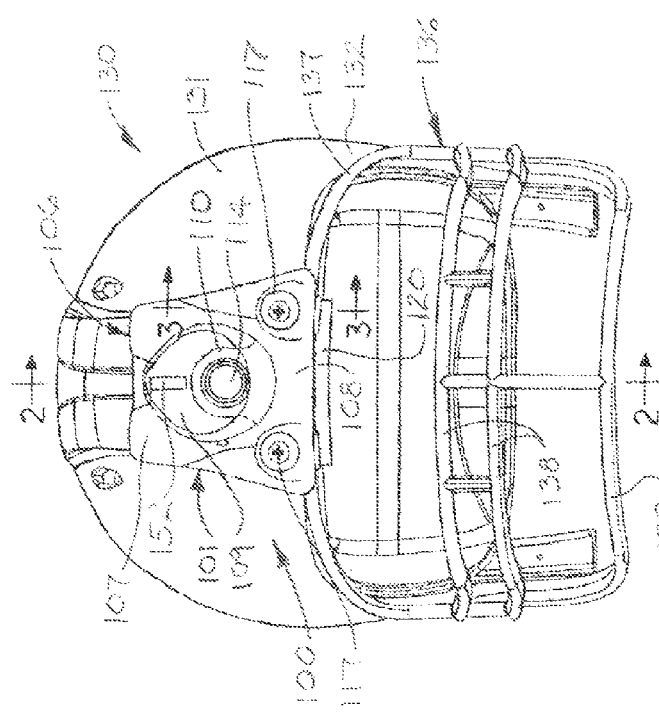
FIG. 1 is a front view of an illustrative embodiment of the helmet mounted imaging systems, mounted on a helmet in exemplary application of the system.

Referring initially to FIGS. 1-5 of the drawings, an illustrative embodiment of the helmet mounted imaging systems is generally indicated by reference numeral 100. As illustrated in FIGS. 1-3, the helmet mounted imaging system 100 is adapted to be mounted on a helmet 130. The helmet 130 may be a sports helmet such as a football helmet, a ski helmet, a skateboarding helmet, a biking helmet or a helmet which is worn by a participant in any other sport which presents a risk of head trauma to a participant of the sport and in which the helmet 130 is worn to prevent or reduce such risk. In the example illustrated in FIGS. 1 and 2, the helmet 130 is a football helmet having a helmet crown 131 with a front crown portion 132. A facemask 136 may be provided on the helmet 130 in front of and beneath the front crown portion 132 of the helmet crown 131. The facemask 136 may include an upper facemask member 137 which extends along the front crown portion 132.

The helmet mounted imaging system 100 may include an impact-resistant system housing 101 which is provided on the helmet crown 131 of the helmet 130. In some embodiments, the system housing 101 may be centered on the front crown portion 132 of the helmet crown 131 generally above the facemask 136, as illustrated in FIG. 1. In other embodiments, the system housing 101 may be provided on a side, rear or in any other suitable location on the helmet crown 131 of the helmet 130. The system housing 101 may include an impact-resistant plastic or material such as polypropylene, polycarbonate, ABS (acrylonitrile butadiene styrene), carbon fiber or any combination thereof, for example and without limitation.

Figure 3A:
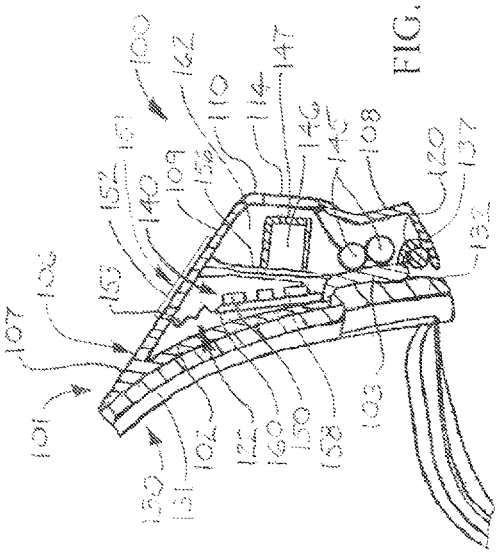
FIG. 3A is an enlarged transverse sectional view of the illustrative helmet mounted imaging system mounted on the helmet as illustrated in FIG. 2.

As illustrated in FIG. 3A, the system housing 101 may have a housing base wall 102 which may include a lower base portion 103. A housing cover wall 106 is provided on the housing base wall 102. As illustrated in FIG. 1, the housing cover wall 106 may include an upper cover wall portion 107 and a lower cover wall portion 108. A center cover wall portion 109 may extend between the upper cover wall portion 107 and the lower cover wall portion 108. As illustrated in FIG. 1, in some embodiments, the center cover wall portion 109 may be generally circular, oval or elliptical in shape in front view. The center cover wall portion 109 may have a lens cover portion 110. A transparent camera lens cover 114 may be provided in the lens cover portion 110. A housing interior 122 is formed by and between the housing base wall 102 and the upper cover wall portion 107, the lower cover wall portion 108 and the center cover wall portion 109.

The system housing 101 may be attached to the front crown portion 132 of the helmet crown 131 using any suitable technique which is suitable for the purpose. As illustrated in FIGS. 1 and 3, in some embodiments, a pair of housing fasteners 117 is extended through a corresponding pair of housing fastener openings (not illustrated) in the lower cover wall portion 108 of the system housing 101. The housing fasteners 117 are threaded into a corresponding pair of fastener openings (not illustrated) in the front crown portion 132 of the helmet crown 131. As illustrated in FIG. 3A, in some embodiments, a facemask receiver 120 may extend along and between the lower cover wall portion 108 of the housing cover wall 106 and the lower base portion 103 of the housing base wall 102. The upper facemask member 137 of the facemask 136 may snap into the facemask receiver 120 to additionally secure the system housing 101 to the helmet 130.

Figure 4:
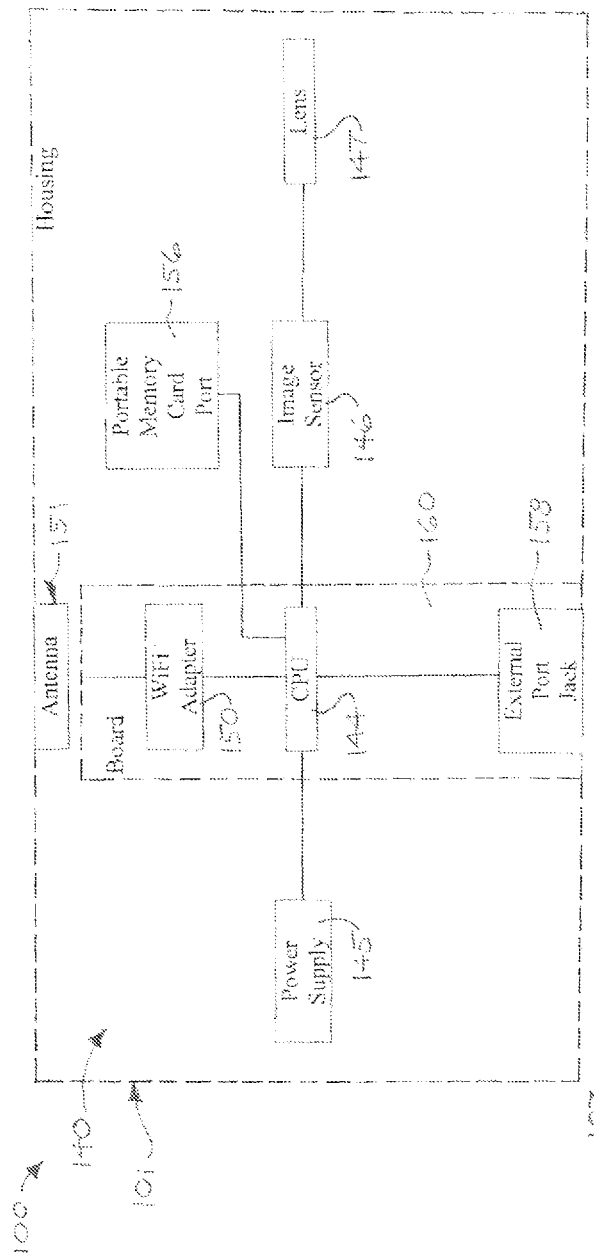
FIG. 4 is a functional block diagram of an exemplary image capture and transmission system according to an illustrative helmet mounted imaging system.

An image capture and transmission system 140 is provided in the housing interior 122 of the system housing 101. A functional block diagram of an exemplary image capture and transmission system 140 is illustrated in FIG. 4. A CPU (central processing unit) 144 with memory interfaces with a power supply 145. The power supply 145 may include at least one rechargeable or replaceable battery or a battery pack and/or may include a solar panel or chip, for example and without limitation. At least one image sensor 146 interfaces with the CPU 144. The image sensor 146 may be any type of camera or image-capturing device which is capable of sighting and capturing still and/or moving images. In some embodiments, for example and without limitation, the image sensor 146 may include a CMOS (complementary metal oxide semiconductor) image sensor which is known by those skilled in the art. The image sensor 146 may include at least one lens 147. The lens 147 may be disposed behind the camera lens cover 114 in the lens cover portion 110 of the housing cover wall 106, as illustrated in FIG. 3A. A WiFi adapter 150 may interface with the CPU 144. An antenna 151 may interface with the WiFi adapter 150.

Figure 5:
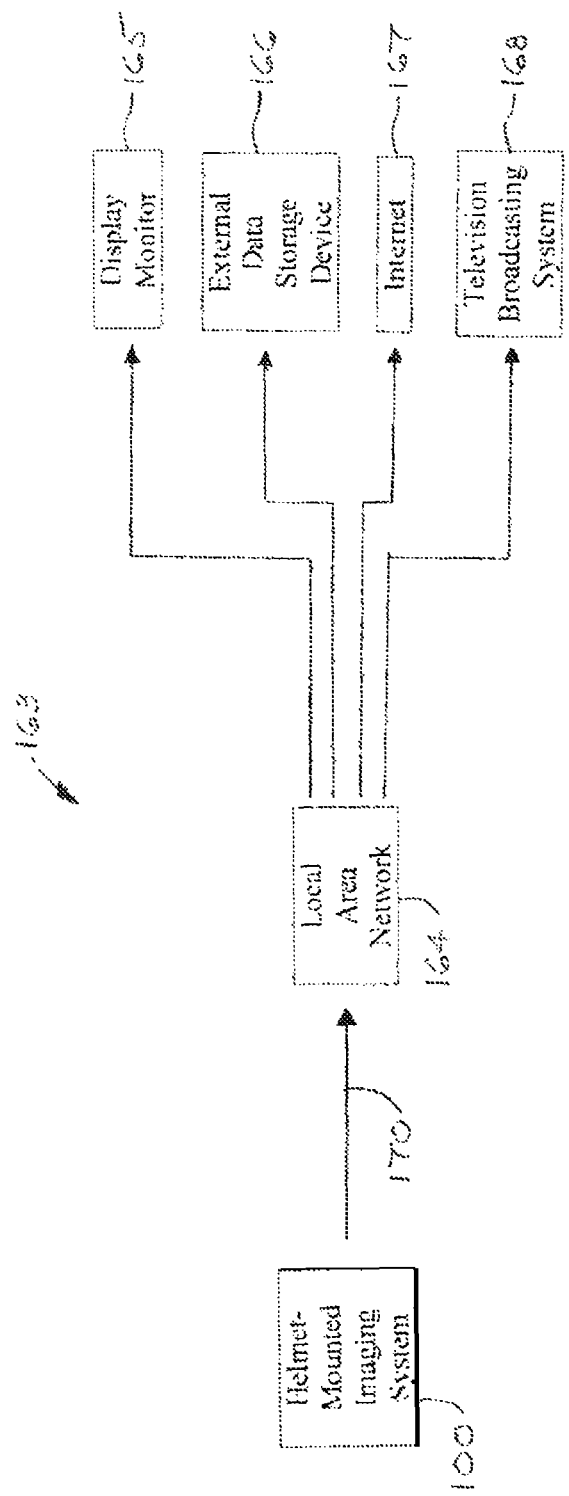
FIG. 5 is a flow diagram illustrating an exemplary image disseminating system in the capture, processing and dissemination of images in implementation of an illustrative helmet mounted imaging system.

An exemplary image disseminating system 163 which is suitable for processing and disseminating images captured by the helmet mounted imaging system 100 is illustrated in FIG. 5. In operation of the helmet mounted imaging system 100, which will be hereinafter further described, the WiFi adaptor 150 of the image capture and transmission system 140 may be adapted to establish communication with an LAN (local area network) 164 through the antenna 151. Accordingly, images which are captured by the image sensor 146 are transmitted by the CPU 144, via the WiFi adapter 150 and the antenna 151, to the LAN 164. The LAN 164 may route or distribute the transmitted images to one or more of multiple destinations such as at least one display monitor 165, at least one external data storage device 166, the Internet 167 and/or a television broadcasting system 168, for example and without limitation.

As illustrated in FIG. 3A, in some embodiments, the antenna 151 of the image capture and transmission system 140 may include an antenna strip 152 which may be embedded in or extend along the exterior surface of the upper cover wall portion 107 of the system housing 101. An antenna connecting wire 153 may connect the embedded antenna strip 152 to the WiFi adapter 150 inside the housing interior 122.

It will be recognized and understood that the image capture and transmission system 140 may include any systems or components which are known by those skilled in the art and are suitable for the purpose of transmitting the images which are captured by the image sensor 146 to a LAN 164 (FIG. 5) or other component for dissemination of the images to one or more desired destinations. These systems or components include but are not limited to those described in U.S. Pat. No. 6,819,354, which is incorporated by reference herein in its entirety.

As further illustrated in FIG. 4, in some embodiments, a portable memory card port 156 may interface with the CPU 144. The portable memory card port 156 may be adapted to receive a memory and such as an SD (secure digital) card or the like to facilitate storage of digital image data files on the memory card such as in the conventional manner. In some embodiments, an external port jack 158 such as a USB port, for example and without limitation, on the exterior of the system housing 101 may interface with the CPU 144. The external port jack 158 may be adapted to interface with a portable data storage device (not illustrated) such as a thumb drive, for example and without limitation, to facilitate uploading and storage of digital image data files to the data storage device. In some embodiments, at least some of the components of the image capture and transmission system 140, such as the CPU 144, the WiFi adapter 150 and the external port jack 158, may be provided on a circuit board 160. A filler material 162 such as polystyrene (Styrofoam®), for example and without limitation, may be provided in the housing interior 122.

In exemplary application of the helmet mounted imaging system 100, the system housing 102 is attached to the front crown portion 132 of the helmet crown 131 of the helmet 130 such as in the manner which was heretofore described with respect to FIGS. 3 and 3A. The helmet 130 may be worn by a football player (not illustrated) as the football player participates in a game of football. Accordingly, the image sensor 146 of the image capture and transmission system 140 faces forwardly from the helmet 130 and captures images through the lens 147 and the camera lens cover 114 in the system housing 102. The images which the image sensor 146 captures may include those which appear in the viewing field of the image sensor 146 during one or more plays of the game. The CPU 144 of the image capture and transmission system 140 transmits the captured images, via the WiFi adapter 150 and the antenna 151, to the LAN 164.

As illustrated in FIG. 5, the WiFi adapter 150 (FIG. 4) of the image capture and transmission system 140 establishes a communication link 170 with a LAN (local area network) 164. From the LAN 164, the captured images may be routed or transmitted to at least one display monitor 165 on which the images may be instantaneously displayed. For example and without limitation, in some applications one or more of the display monitors 165 on which the images appear may be placed throughout a stadium or arena in which the football game is played for viewing by spectators of the game. Additionally or alternatively, the captured images may be stored as one or more digital image data files on an external data storage device 166 for later retrieval and distribution from the external data storage device 166. The captured images may be disseminated to personal computers, tablets, cell phones and other viewing devices via the Internet 167 or may be broadcast via a television broadcasting system 168. It will be appreciated by those skilled in the art that the system housing 102 protects the components of the image capture and transmission system 140 as the helmet 130 strikes other players, objects or the ground during play. This protecting function of the system housing 102 facilitates prolonged functioning of the image sensor 146 throughout the spoiling event as well as repeated use of the helmet mounted imaging system 100.

In some applications, an SD or other memory card (not illustrated) can be inserted in the portable memory card port 156 of the image capture and transmission system 140 prior to operation of the helmet mounted imaging system 100. The images which are captured by the image sensor 146 may be stored as digital image data files on the memory card. After operation, the memory card may be removed from the portable memory card port 156 and the digital image data files accessed typically in the conventional manner. In some applications, a portable data storage device (not illustrated) such as a thumb drive, for example and without limitation, may be inserted in the external port jack 158 to facilitate uploading and storage of digital image data files from the CPU 144 to the portable data storage device.

Referring next to FIGS. 6-13 of the drawings, an alternative illustrative embodiment of the helmet mounted imaging system is generally indicated by reference numeral 200. The helmet mounted imaging system 200 may include an impact-resistant system housing 201 which is adapted for attachment to a helmet 230 (FIG. 6) such as in a manner which will be hereinafter described. The system housing 201 encloses and protects an image capture and transmission system 140, which may be the same as or similar in design to the image capture and transmission system 140 of the helmet mounted imaging system 100 heretofore described with respect to FIGS. 1-5. The system housing 201 may include a housing base wall 202. The housing base wall 202 of the system housing 201 may be generally elongated and rectangular with a curved or concave shape which matches the complementary curved or convex trajectory of the front crown portion 232 of the helmet 230. A reinforcing base flange 204 may extend along the housing base wall 202. As illustrated in FIG. 8, at the middle or center of the system housing 201, a generally flat or planar lower base portion 203 may interrupt the base flange 204. As illustrated in FIG. 9, the lower base portion 203 may be offset forwardly relative to the plane of the housing base wall 202 to form a lower housing cavity 205. A pair of spaced-apart fastener openings 211 (one of which is illustrated in FIG. 9) may extend through the housing base wall 202 for purposes which will be hereinafter described.

Figure 7:
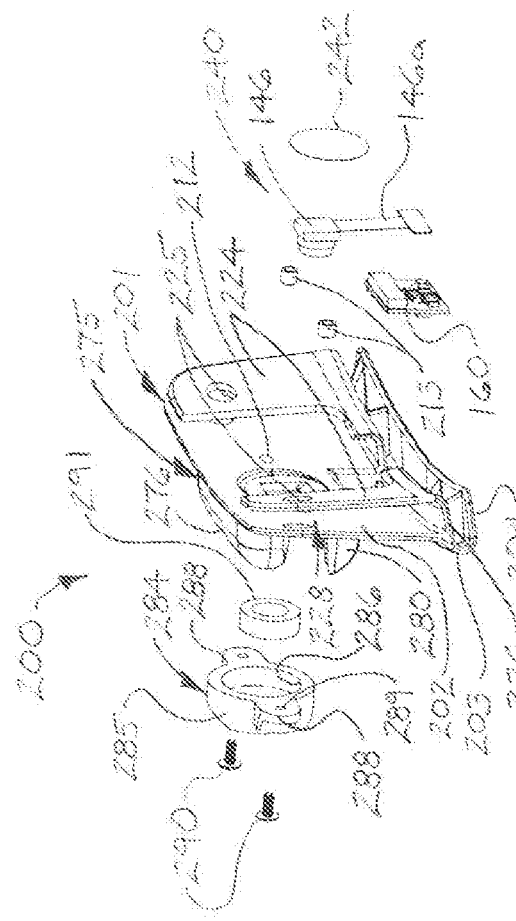
FIG. 7 is an exploded rear view of the alternative illustrative helmet mounted imaging system illustrated in FIG. 6.

As particularly illustrated in FIG. 7, at least one housing attachment flange 224 may be disposed in spaced-apart, generally parallel and adjacent relationship to the housing base wall 202. Each housing attachment flange 224 may have a fastener opening 225 which registers with a corresponding fastener opening 211 in the housing base wall 202. A flange connecting portion 226 may connect each housing attachment flange 224 to the housing base wall 202. A clamp space 228 is formed by and between the housing base wall 202 and each corresponding housing attachment flange 224 for purposes which will be hereinafter described.

As illustrated in FIG. 9, an image sensor cavity 272 may extend into the housing base wall 202 of the system housing 201. The image sensor cavity 272 accommodates the image sensor 146 of the image capture and transmission system 140. A membrane seal 242 (FIG. 7) may be sandwiched between the image sensor cavity 272 and the image sensor 146 for humidity sealing purposes.

An impact-resistant image sensor shield 284 may be fitted over the image sensor 146 and attached to the housing base wall 202 of the system housing 201. The image sensor shield 284 substantially surrounds and covers the image sensor 146 to shield and protect the image sensor 146 during use of the helmet mounted imaging system 200. The image sensor shield 284 may include an impact-resistant plastic or material such as polypropylene, polycarbonate, ABS (acrylonitrile butadiene styrene), carbon fiber or any combination thereof, for example and without limitation. As illustrated in FIGS. 11-13, the image sensor shield 284 may include a generally annular or cylindrical shield wall 285 having a shield interior 286 (FIG. 13). A transparent lens cover 287 may be mounted in the shield wall 285 adjacent to the shield interior 286. A pair of shield flanges 288 having fastener openings 289, respectively, may extend from the shield wall 285.

As further illustrated in FIG. 9, an annular or cylindrical shield mount flange 273 may extend forwardly from the base wall 202 in generally concentric relationship to the image sensor cavity 272. The shield interior 286 (FIG. 13) in the shield wall 285 accommodates the shield mount flange 273 with the shield wall 285 encircling the shield mount flange 273. The image sensor 146 is disposed within the shield interior 286 of the image sensor shield 284, with the lens 147 of the image sensor 146 immediately behind the lens cover 287 in the shield wall 285 of the image sensor shield 284. In some embodiments, a shield ring 291, which may include a resilient material such as polyethylene, for example and without limitation, may be sandwiched between the image sensor 146 and the shield mount flange 273 of the system housing 201 to additionally pad or protect the image sensor 146 within the shield interior 286.

As illustrated in FIG. 7, the image sensor shield 284 may be attached to the housing base wall 202 of the system housing 201 by, for example and without limitation, extending a pair of shield fasteners 290 through the respective shield fastener openings 289 in the shield flanges 288 and threading the shield fasteners 290 into a registering pair of shield fastener openings 212 (FIG. 10) in the housing base wall 202. As further illustrated in FIG. 7, the shield fasteners 290 may be threaded into a pair of respective threaded inserts 213 which may be seated in the shield fastener openings 212.

As illustrated in FIGS. 7-9, at least one protective housing bumper 275 may extend from the housing wall 202 of the system housing 201 in generally adjacent or surrounding relationship to the image sensor shield 284. The protective housing bumper 275 may be flexible or resilient and imparts additional impact protection to the image sensor 146 during use of the helmet mounted imaging system 200. In some embodiments, the protective housing bumper 275 may include an upper housing bumper portion 276 which extends from the housing base wall 202 generally above the image sensor shield 284. The upper housing bumper portion 276 may have an upper shield notch 277 which accommodates the upper portion of the shield wall 285 of the image sensor shield 284. The protective housing bumper 275 may further include a pair of lower housing bumper portions 280 which extend from the housing base wall 202 generally beneath the image sensor shield 284. Each of the lower housing bumper portions 280 may have a lower shield notch 281 which accommodates a corresponding lower side portion of the shield wall 285. As illustrated in FIG. 9, the upper housing bumper portion 276 and the lower housing bumper portions 280 of the protective housing bumper 275 may protrude beyond the plane of the lens cover 287 on the image sensor shield 284. In alternative embodiments, the protective housing bumper 275 may include any number of grouped housing bumper portions which substantially surround the image sensor shield 284. For example and without limitation, in some embodiments the protective housing bumper 275 may include a pair of left and right side housing bumper portions (not illustrated) which accommodate the left and right sides, respectively, of the image sensor shield 284. In other embodiments, the protective housing bumper 275 may include a single continuous housing bumper portion (not illustrated) which extends from the housing base wall 202 in surrounding relationship to the image sensor shield 284.

An exemplary arrangement of the functional components of the image capture and transmission system 140 in the system housing 101 is illustrated in FIGS. 7 and 9. The image sensor 146 is secured within the shield interior 286 (FIG. 13) of the image sensor shield 284, typically as was heretofore described. The circuit board 160 with the CPU 144, power supply 145 (FIG. 4), WiFi adapter 150, portable memory card port 156 and external port jack 158 may be contained within the lower housing cavity 205 (FIG. 9). As illustrated in FIG. 10, at least some of these components may be accessible through a housing opening 215 in the rear of the system housing 201. The image sensor 146 may be connected to the CPU 144 (FIG. 4) through an image sensor contact 146a. The lower base portion 203 of the system housing 201 protects these components from impact during use of the helmet mounted imaging system 200.

Figure 6:
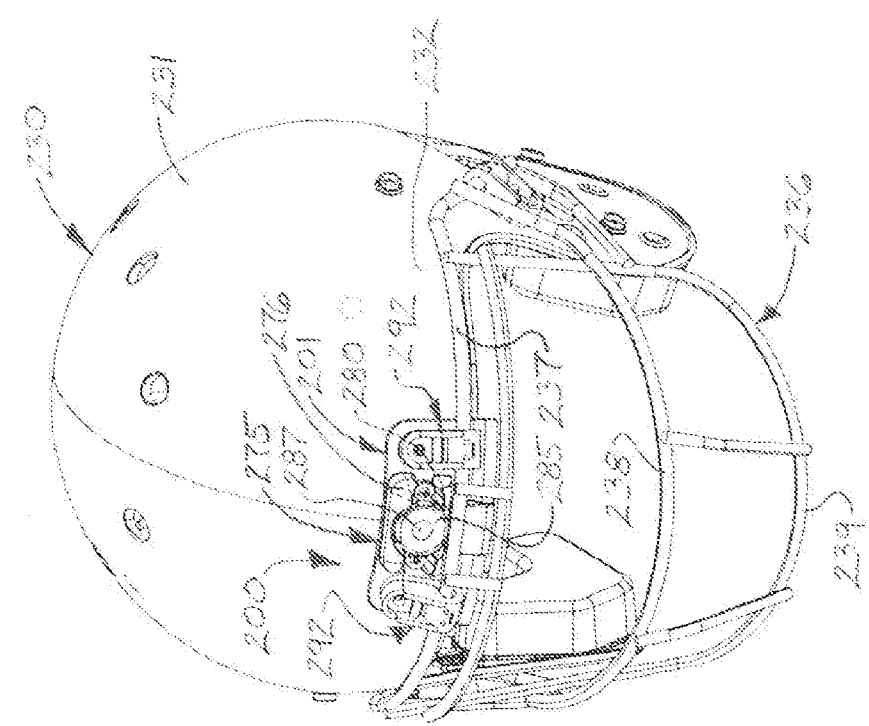
FIG. 6 is a front perspective view of an alternative illustrative embodiment of the helmet mounted imaging system, mounted on a helmet in exemplary application of the system.

Application of the helmet mounted imaging system 200 may be as was heretofore described with respect to the helmet mounted imaging system 200 in FIGS. 1-5. An exemplary manner of attaching the helmet mounted imaging system 200 to a helmet 230 is illustrated in FIG. 6. Accordingly, at least one facemask clamp 292 may attach the system housing 201 to the helmet 230. Each facemask clamp 292 may be conventional and includes a facemask opening 293 (FIG. 9) which accommodates the upper facemask member 237 of the facemask 236, as illustrated in FIG. 6. The clamp space 228 (FIG. 9) between the housing base wall 202 and the housing attachment flanges 224 accommodates the front crown portion 232 of the helmet crown 231 of the helmet 230. A pair of housing fasteners (not illustrated) is extended through fastener openings 294 in the respective facemask clamps 292 and threaded through the fastener openings 211 in the housing base wall 202 and the registering fastener openings 225 in the respective housing attachment flanges 224. The housing fasteners may additionally be threaded into a respective pair of fastener openings (not illustrated) in the front crown portion 232 of the helmet 230.

As a sports participant such as a football player wears the helmet 230, the image sensor 146 captures images which the image capture and transmission system 140 transmits to a LAN 164 (FIG. 5). The LAN 164 may transmit the digital image data files to one or more selected destinations such as at least one display monitor 165, at least one external data storage device 166, the Internet 167 and/or a television broadcasting system 168, for example and without limitation. The protective housing bumper 275, the image sensor shield 284 and the system housing 201 protect the image sensor 146 and other components of the image capture and transmission system 140 as the helmet 230 strikes other players, objects or the ground during play. The reinforcing base flange 204 which extends along the housing base wall 202 may impart torsional rigidity to the system housing 101.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A helmet mounted imaging system for a helmet, comprising:
   an impact-resistant system housing adapted for attachment to the helmet;
   an image capture and transmission system carried by the system housing, the image capture and transmission system including at least one image sensor;
   an impact-resistant image sensor shield carried by the system housing, the image sensor shield substantially covering the image sensor and including a shield wall having an shield interior and a lens cover adjacent to the shield interior, the shield interior accommodates the image sensor.

2. The helmet mounted imaging system of claim 1 further comprising at least one protective housing bumper carried by the system housing adjacent to the image sensor shield.

3. The helmet mounted imaging system of claim 2 wherein the protective housing bumper protrudes from the system housing beyond the image sensor shield.

4. The helmet mounted imaging system of claim 3 wherein the protective housing bumper comprises a plurality of discrete housing bumper portions.

5. The helmet mounted imaging system of claim 1 further comprising a shield mount flange carried by the system housing, and wherein the shield interior of the image sensor shield accommodates the shield mount flange.

6. The helmet mounted imaging system of claim 1 wherein the system housing comprises a housing base wall, at least one housing attachment flange carried by the housing base wall and a clamp space between the housing base wall and the at least one housing attachment flange, and wherein the image sensor shield is carried by the housing base wall.

7. The helmet mounted imaging system of claim 6 further comprising a torsion-resistant reinforcing base flange extending along the housing base wall.

8. A helmet mounted imaging system for a helmet, comprising:
- an impact-resistant system housing adapted for attachment to the helmet, the system housing including:
  - a housing base wall having an image sensor cavity; and
  - a shield mount flange carried by the housing base wall;
- an image capture and transmission system carried by the system housing, the image capture and transmission system including at least one image sensor disposed within the image sensor cavity of the housing base wall and having at least one lens; and
- an impact-resistant image sensor shield carried by the system housing, the image sensor shield including:
  - a shield wall;
  - an shield interior formed by the shield wall, the shield interior accommodating the shield mount flange of the housing base wall; and
  - a lens cover carried by the shield wall adjacent to the lens of the image sensor.

9. The helmet mounted imaging system of claim 8 further comprising at least one protective housing bumper carried by the system housing adjacent to the image sensor shield.

10. The helmet mounted imaging system of claim 9 wherein the protective housing bumper protrudes from the system housing beyond the image sensor shield.

11. The helmet mounted imaging system of claim 10 wherein the protective housing bumper comprises a plurality of discrete housing bumper portions.

12. The helmet mounted imaging system of claim 11 wherein each of the housing bumper portions comprises a shield notch accommodating the shield wall of the image sensor shield.

13. The helmet mounted imaging system of claim 8 further comprising a shield ring sandwiched between the image sensor and the shield mount flange.

14. The helmet mounted imaging system of claim 8 further comprising at least one housing attachment flange carried by the housing base wall and a clamp space between the housing base wall and the at least one housing attachment flange.

15. The helmet mounted imaging system of claim 8 further comprising a torsion-resistant reinforcing base flange extending along the housing base wall.

16. A helmet mounted imaging system for a helmet, comprising:
- an impact-resistant system housing including:
  - a housing base wall;
  - a housing cover wall carried by the housing base wall, the housing cover wall having:
    - a first cover wall portion;
    - a second cover wall portion;
    - a center cover wall portion extending between the first cover wall portion and the second cover wall portion; and
    - a lens cover carried by the center cover wall portion; and
- an image capture and transmission system in the system housing, the image capture and transmission system including at least one image sensor adjacent to the lens cover.

17. The helmet mounted imaging system of claim 16 further comprising a facemask receiver carried by the second cover wall portion of the housing cover wall.

18. The helmet mounted imaging system of claim 16 wherein the center cover wall portion is circular, oval or elliptical in shape.

19. The helmet mounted imaging system of claim 16 wherein the image capture and transmission system comprises a WiFi adapter.

* * * * *